(12) United States Patent
Villagomez et al.

(10) Patent No.: US 8,690,554 B2
(45) Date of Patent: *Apr. 8, 2014

(54) DIAPHRAGM PUMP USING DUCKBILL AND OTHER TYPES OF VALVES

(75) Inventors: Manuel Villagomez, Corona, CA (US); Humberto V. Meza, Tustin, CA (US); David L. Phillips, Santa Ana, CA (US)

(73) Assignee: Xylem IP Holdings LLC, White Plains, NY (US)

( * ) Notice: Subject to any disclaimer, the term of this patent is extended or adjusted under 35 U.S.C. 154(b) by 323 days.

This patent is subject to a terminal disclaimer.

(21) Appl. No.: 13/183,866

(22) Filed: Jul. 15, 2011

(65) Prior Publication Data
US 2013/0017110 A1   Jan. 17, 2013

(51) Int. Cl.
F04B 39/10   (2006.01)

(52) U.S. Cl.
USPC ........... 417/560; 417/571; 417/269; 137/846; 137/850

(58) Field of Classification Search
USPC .......................................... 417/269, 560, 571
See application file for complete search history.

(56) References Cited

U.S. PATENT DOCUMENTS

| | | | | |
|---|---|---|---|---|
| 2,328,948 A | * | 9/1943 | Bourke | 217/103 |
| 2,417,968 A | * | 3/1947 | Browne | 137/850 |
| 3,334,646 A | * | 8/1967 | Billeter et al. | 137/218 |
| 3,465,595 A | | 9/1969 | Tansony | |
| 3,507,585 A | | 4/1970 | Mercer | |
| 4,396,357 A | * | 8/1983 | Hartley | 417/269 |
| 4,936,753 A | | 6/1990 | Kozumplik, Jr. et al. | |
| 5,415,532 A | | 5/1995 | Loughnane et al. | |
| 5,707,219 A | * | 1/1998 | Powers | 417/386 |
| 5,902,096 A | | 5/1999 | Behringer et al. | |
| 5,988,998 A | | 11/1999 | Glover | |
| 6,435,950 B1 | | 8/2002 | Pettit et al. | |
| 6,758,657 B1 | | 7/2004 | McNaull et al. | |
| 7,101,265 B1 | | 9/2006 | Schur et al. | |
| 7,373,946 B2 | | 5/2008 | Sigler et al. | |
| 7,670,479 B2 | | 3/2010 | Arett et al. | |
| 8,276,616 B2 | * | 10/2012 | Wright et al. | 137/850 |
| 8,449,267 B2 | * | 5/2013 | Pascual et al. | 417/269 |
| 2006/0021919 A1 | | 2/2006 | Olson et al. | |
| 2007/0140925 A1 | | 6/2007 | Phelps | |
| 2008/0181790 A1 | * | 7/2008 | Meza et al. | 417/45 |
| 2009/0281485 A1 | | 11/2009 | Baker et al. | |
| 2010/0108714 A1 | | 5/2010 | Bertucci et al. | |
| 2010/0133297 A1 | | 6/2010 | Arett et al. | |

FOREIGN PATENT DOCUMENTS

EP   0705978   10/1996
GB   2128683   5/1984

* cited by examiner

Primary Examiner — Charles Freay

(57) ABSTRACT

A diaphragm pump is provided that features a valve housing configured with inlet openings and outlet openings; inlet duckbill check valve assemblies, each configured to be arranged in a respective inlet opening; and outlet duckbill check valve assemblies, each configured to be arranged in a respective outlet opening; each duckbill check valve assembly comprising: a duckbill check valve seat configured with an end having a slit to open to provide the fluid and particulate, and to close to prevent the backflow of the fluid and particulate; and a duckbill check valve support having a base portion configured to be inserted inside the duckbill check valve seat, and having a W-shaped portion configured with an opening to pass the fluid and particulate through the duckbill check valve support to the duckbill check valve seat and also configured to provide support for walls of the duckbill check valve seat in response to back pressure caused by the fluid and particulate.

15 Claims, 12 Drawing Sheets

Valve Housing with Drive Mechanism

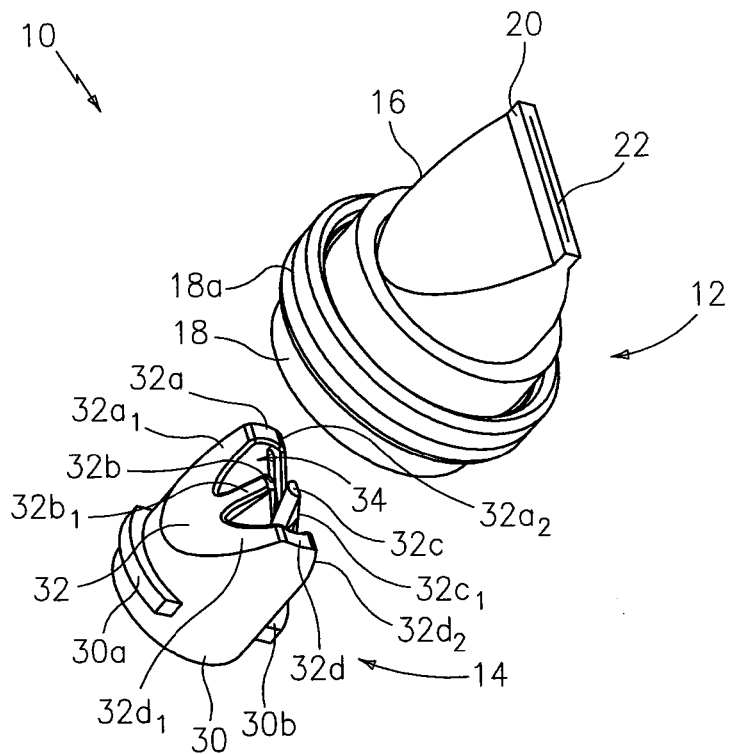
*FIG. 1a* : Exploded view of duckbill check valve assembly
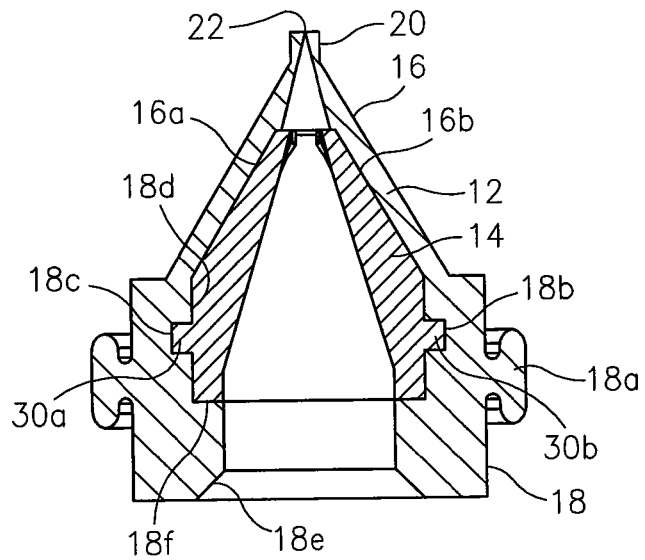
*FIG. 1b* : Cross-section of duckbill check valve assembly

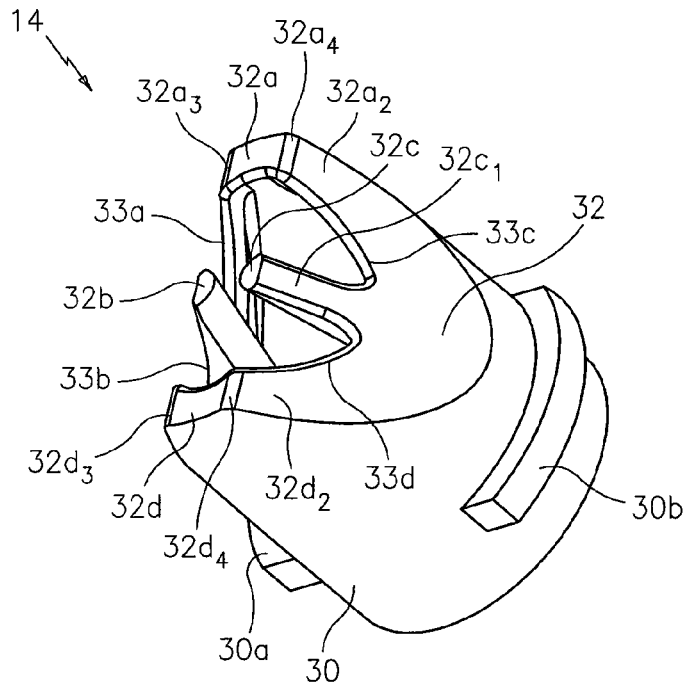
FIG. 2a : Top perspective view of duckbill check valve support
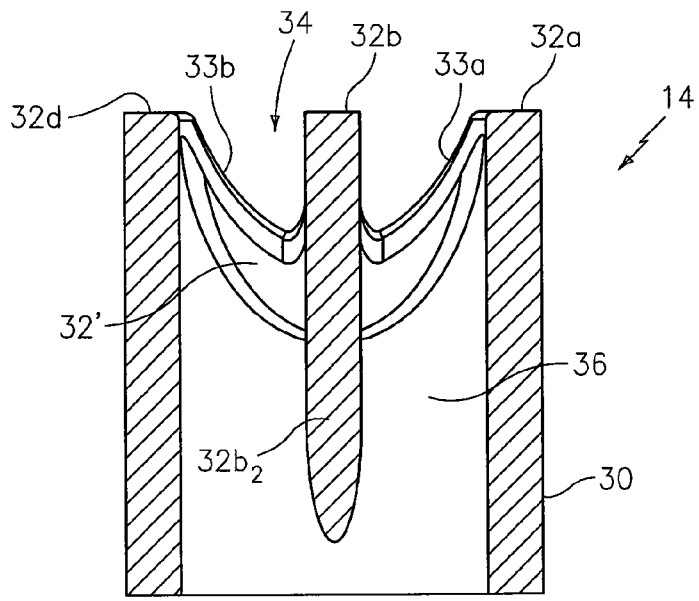
FIG. 2b : Cross-section of duckbill check valve support

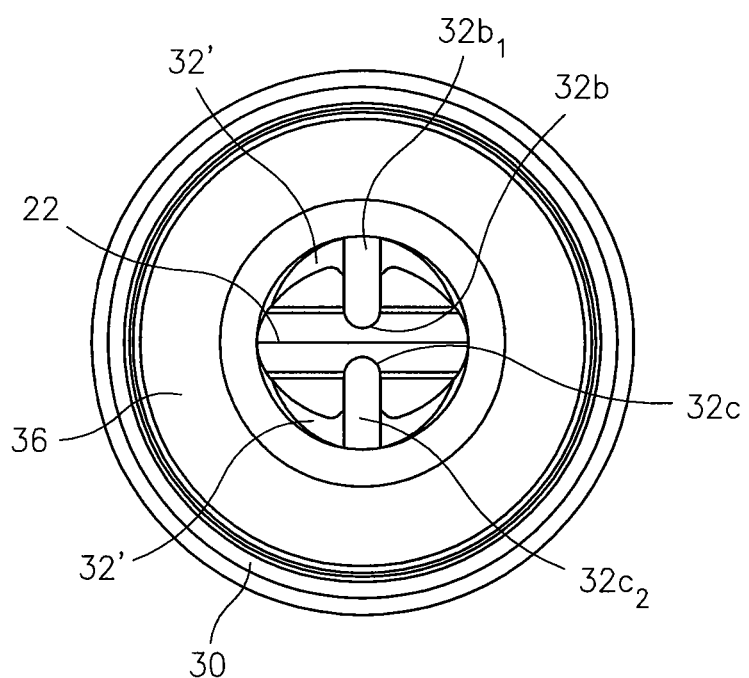
*FIG. 2c* : Bottom view of duckbill check valve support

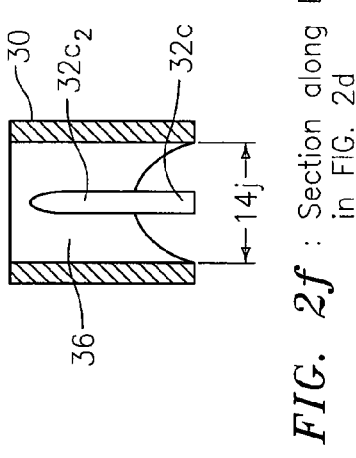
FIG. 2f: Section along B-B in FIG. 2d
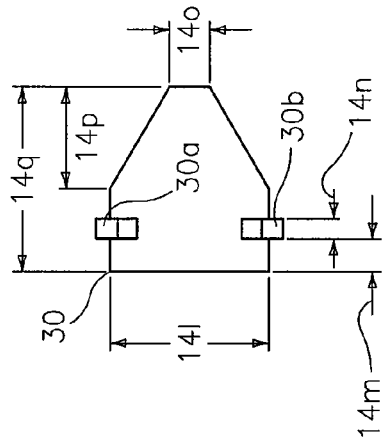
FIG. 2i: Side view along A-A in FIG. 2d of duckbill check valve support
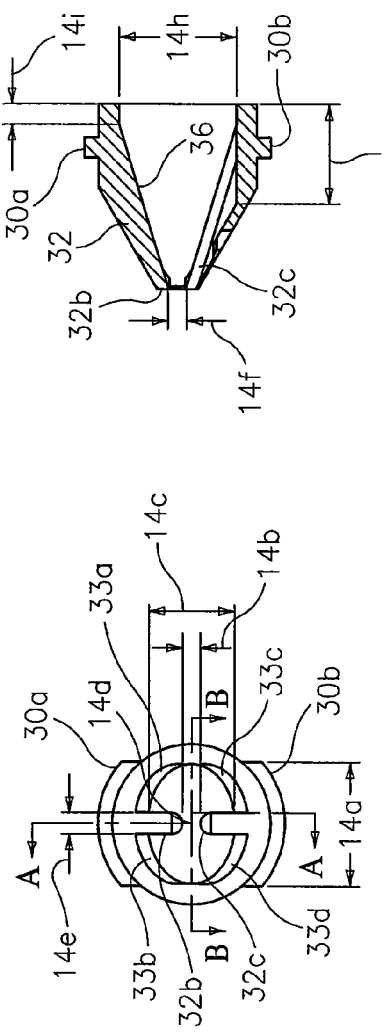
FIG. 2e: Section along A-A in FIG. 2d
FIG. 2h: Side perspective view of duckbill check valve support
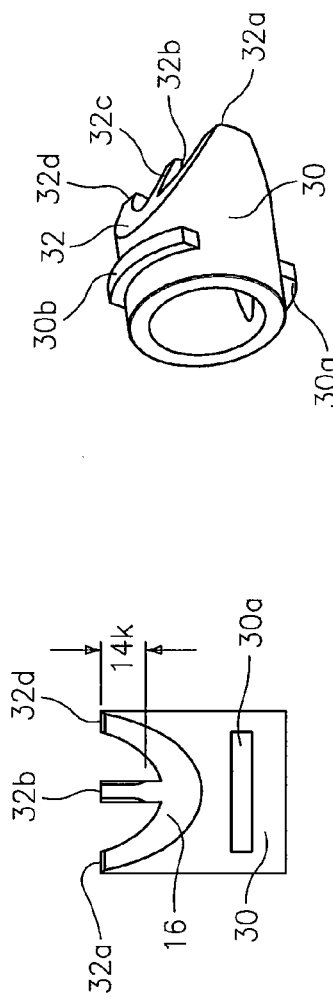
FIG. 2d: Top view of duckbill check valve support
FIG. 2g: Side view along B-B in FIG. 2d of duckbill check valve support

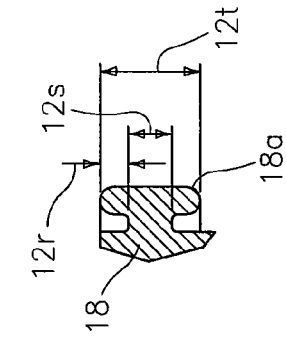
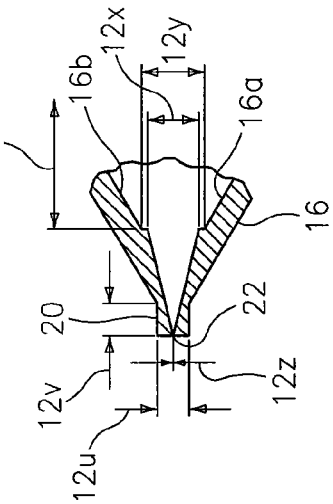
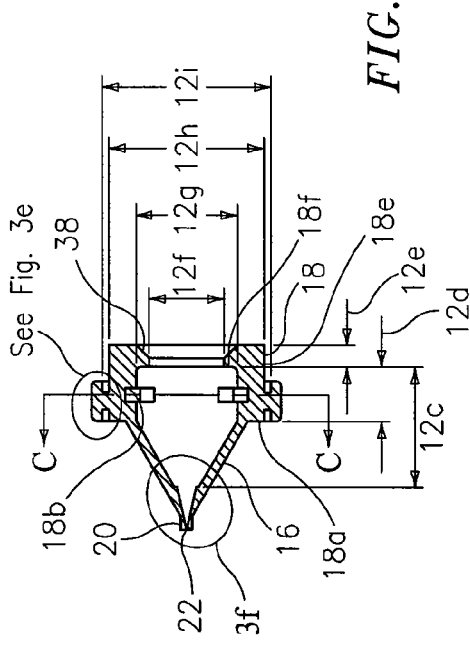
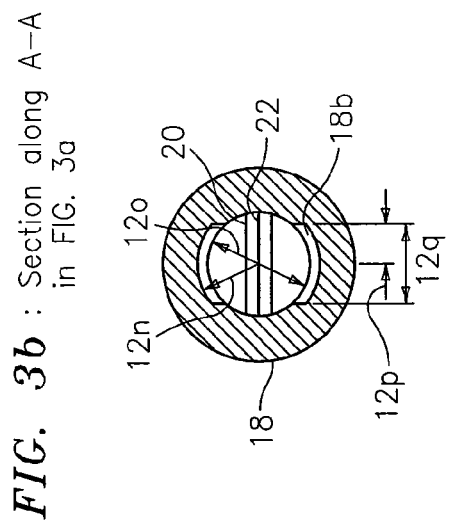
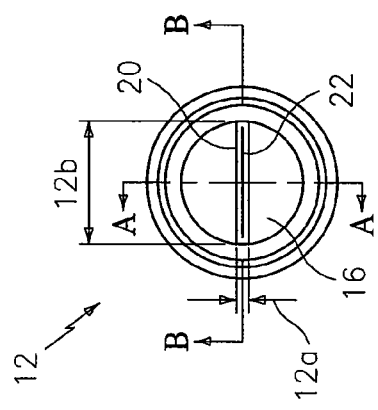
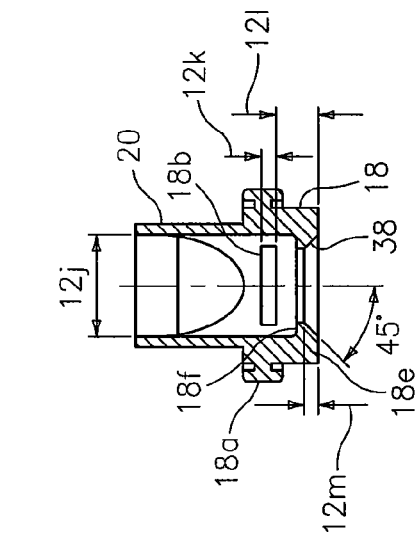
FIG. 3e: Detailed view of portion D in FIG. 3b of duckbill check valve seat
FIG. 3f: Detailed view of portion E in FIG. 3b of duckbill check valve seat
FIG. 3b: Section along A-A in FIG. 3a
FIG. 3d: Section along C-C in FIG. 3b
FIG. 3a: Top view of duckbill check valve seat
FIG. 3c: Section along B-B in FIG. 3a

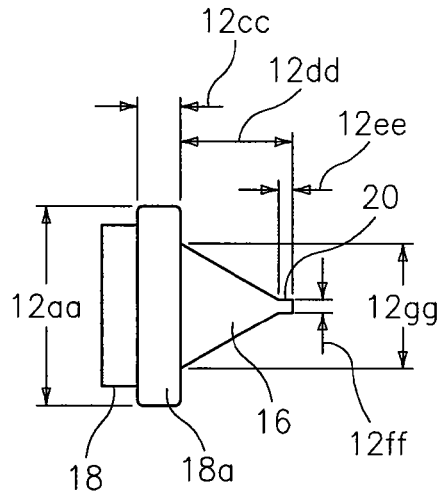
FIG. 3g: Side view along A-A in FIG. 3a of duckbill check valve seat
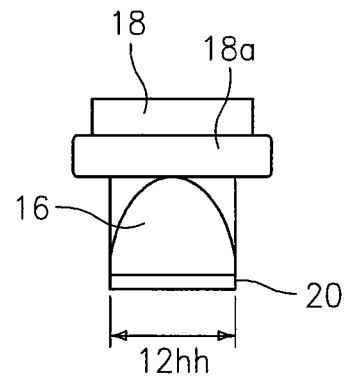
FIG. 3h: Side view along B-B in FIG. 3a of duckbill check valve seat
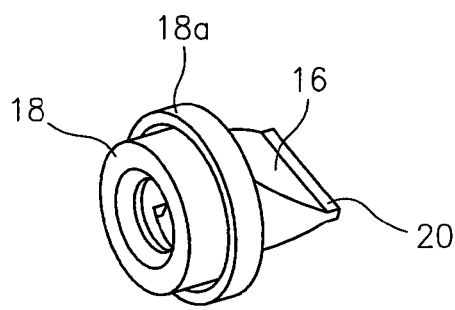
FIG. 3i: Side perspective view of duckbill check valve seat
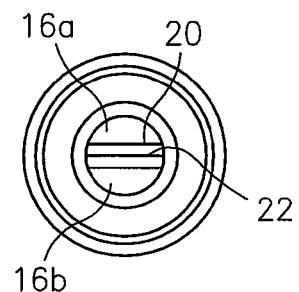
FIG. 3j: Bottom view of duckbill check valve seat

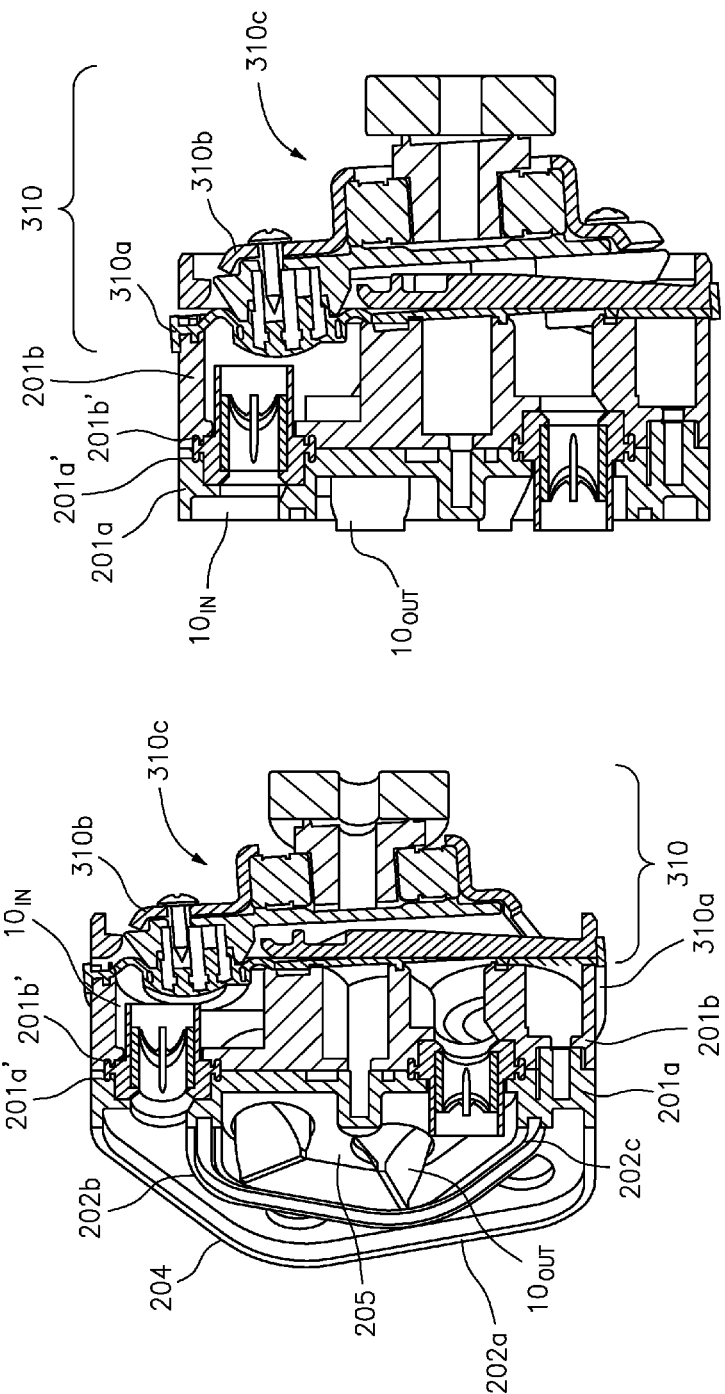

Cutaway view of pump from right side

Figure 9: Alternative Valve Designs
Figure 9a
Figure 9b
Figure 9c
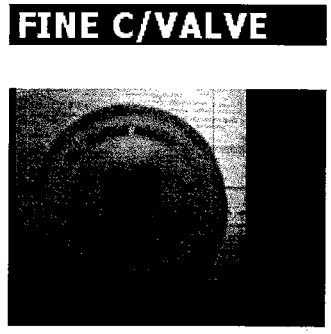
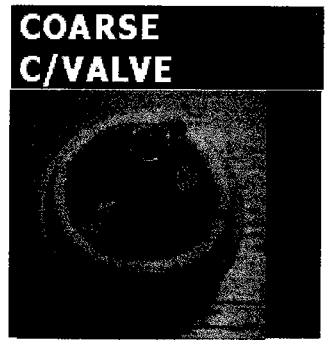
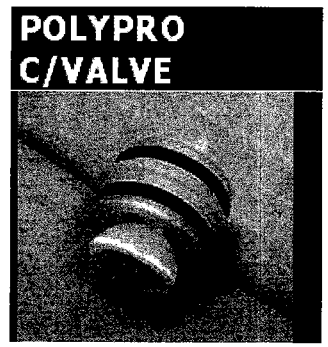
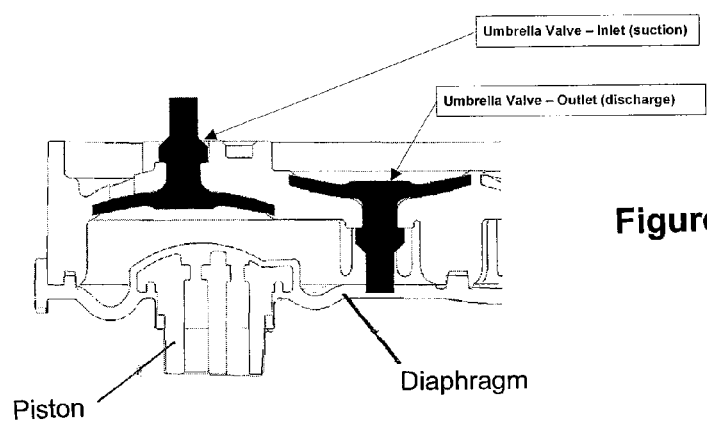
Figure 10 (Prior art)

DIAPHRAGM PUMP USING DUCKBILL AND OTHER TYPES OF VALVES

BACKGROUND OF THE INVENTION

1. Field of the Invention

The present invention relates to a pump; and more particularly relates to a diaphragm pump.

2. Brief Description of Related Art

Diaphragm pumps are known in the art, and take the form of positive displacement pumps that are configured with one or more chambers for pumping a fluid. Diaphragm pumps use check valves to allow fluids to pass in one direction either from an inlet side to an outlet side of a valve housing, or vice versa. In particular, a typical diaphragm pump uses a combination of the reciprocating action of a diaphragm and suitable non-return check valves to pump the fluid. The diaphragm is typically sealed with one side in the fluid to be pumped and flexed, causing the volume of the pump chamber to increase and decrease. A pair of non-return check valves prevent reverse flow of the fluid. In operation, when the volume of a chamber of the pump is increased (e.g., the diaphragm moving up), the pressure decreases, and fluid is drawn into the chamber. When the chamber pressure later increases from decreased volume (e.g., the diaphragm moving down), the fluid previously drawn in is forced out. Finally, the diaphragm moving up once again draws fluid into the chamber, completing the cycle.

FIG. 10 shows an example of one such umbrella style check valve used on rotary diaphragm pumps. The short comings of using such umbrella style check valves on rotary diaphragm pumps are that any particulates that gather under the valves will disrupt the priming and the pressure of the pumping process.

SUMMARY OF THE INVENTION

The present invention provides new and unique apparatus in the form of a diaphragm pump comprising: a valve housing configured with inlet openings and outlet openings; inlet duckbill check valve assemblies, each configured to be arranged in a respective inlet opening; and outlet duckbill check valve assemblies, each configured to be arranged in a respective outlet opening; each duckbill check valve assembly comprising: a duckbill check valve seat configured with an end having a slit to open to provide the fluid and particulate, and to close to prevent the backflow of the fluid and particulate; and a duckbill check valve support having a base portion configured to be inserted inside the duckbill check valve seat, and having a W-shaped portion configured with an opening to pass the fluid and particulate through the duckbill check valve support to the duckbill check valve seat and also configured to provide support for walls of the duckbill check valve seat in response to back pressure caused by the fluid and particulate.

By way of example, the duckbill check valve assembly may take the form of that disclose in U.S. patent application Ser. No. 12/723,975, filed on 15 Mar. 2010, which is hereby incorporated by reference in its entirety, and which includes a rigid insert, e.g., plastic, that can be used to strengthen a duckbill valve against back pressure, especially where the insert has a special concave shape with a "W" design, which keeps good support for the main check valve but also allows large particulates to pass through the center.

The present may include one or more of the following features:

The valve housing may be configured with a valve housing chamber to receive the fluid from an inlet chamber via the inlet duckbill check valve assemblies. The valve housing may be configured to provide the fluid from the valve housing chamber to an outlet chamber via the outlet duckbill check valve assemblies. The valve housing may also be shaped as a pentagon, and the valve housing may also have five inlet openings for providing the fluid and particulate from the inlet chamber to the valve housing chamber. The valve housing may be configured as a pentagon, and the peripheral region has five outlet openings for providing the fluid and particulate from the valve housing chamber to the outlet chamber.

Regarding the duckbill check valve assembly, each inlet duckbill check valve seat may be configured with the end having the slit to open to provide the fluid and particulate from an inlet side to a discharge side, and to close to prevent the backflow of the fluid and particulate from the discharge side to inlet side. Each outlet duckbill check valve seat may be configured with the end having the slit to open to provide the fluid and particulate from a discharge side, and to close to prevent the backflow of the fluid and particulate from the discharge side to an inlet side. The W-shaped portion is configured with outer walls to support walls of the end of the duckbill check valve seat. The W-shaped portion may also include two end supporting arms and two raised intermediate supporting arms configured to form the opening to pass the fluid and particulate through the duckbill check valve support to the duckbill check valve seat and provide support for walls of the duckbill check valve seat in response to back pressure caused by the fluid and particulate, including back pressure up to about 80 PSI. The duckbill check valve support may also include two locating tabs or wings, and the base portion of the duckbill check valve seat includes two locating recesses arranged in its internal walls and configured to receive the two locating tabs or wings in order to axially align the duckbill check valve seat in relation to the duckbill check valve support in a proper orientation and at a proper depth, as well as to prevent the duckbill check valve support from being pushed out of the duckbill check valve seat due to back pressure.

The duckbill check valve support may be made of metal or plastic, the duckbill check valve seat is made of a pliable material, including rubber or a synthetic elastomeric material, or the combination thereof.

The diaphragm pump may be a rotary diaphragm pump.

According to some embodiment, the present invention may also take the form of a diaphragm pump comprising: a valve housing configured with at least one inlet opening and at least one outlet opening; at least one inlet duckbill check valve assembly configured to be received by said at least one inlet opening; at least one outlet duckbill check valve assembly configured to be received by said at least one outlet inlet opening; where each duckbill check valve assembly has features consistent with that described herein.

According to some embodiment of the present invention, said valve housing may also be configured with a plurality of inlet openings; and said at least one inlet duckbill check valve assembly comprising a plurality of inlet duckbill check valve assemblies, each configured to be arranged in a respective one of said plurality of inlet openings.

According to some embodiment of the present invention, said valve housing may also be configured with a plurality of outlet openings; and said at least one outlet duckbill check valve assembly comprising a plurality of outlet duckbill check valve assemblies, each configured to be arranged in a respective one of said plurality of outlet openings.

One advantage of the present invention is that by replacing the umbrella style check valves in the rotary diaphragm pump in the prior art with duck bill valves, the pumping process is facilitated by allowing particulates to pass through without fouling the valves. For example, utilizing duckbill valves will allow round solids up to 4 mm to pass through without disrupting the pumping process of the pump.

BRIEF DESCRIPTION OF THE DRAWING

The drawing, which are not necessarily drawn to scale, includes the following Figures:

FIG. 1a is an exploded view of a duckbill check valve assembly according to some embodiments of the present invention.

FIG. 1b is a view of cross-section of a duckbill check valve assembly according to some embodiments of the present invention.

FIG. 2a is a top perspective view of a duckbill check valve support that forms part of the duckbill check valve assembly shown in FIGS. 1a and 1b.

FIG. 2b is a view of cross-section of the duckbill check valve support shown in FIG. 2a.

FIG. 2c is a bottom view of the duckbill check valve support shown in FIG. 2a.

FIG. 2d is a top view of a duckbill check valve support that forms part of the duckbill check valve assembly shown in FIGS. 1a and 1b.

FIG. 2e is a section view along A-A of the duckbill check valve support shown in FIG. 2d.

FIG. 2f is a section view along B-B of the duckbill check valve support shown in FIG. 2d.

FIG. 2g is a side view along B-B of the duckbill check valve support shown in FIG. 2d.

FIG. 2h is a side perspective view of the duckbill check valve support shown in FIG. 2d FIG. 2i is a side view along A-A of the duckbill check valve support shown in FIG. 2d.

FIG. 3a is a top view of a duckbill check valve seat that forms part of the duckbill check valve assembly shown in FIGS. 1a and 1b.

FIG. 3b is a section view along A-A of the duckbill check valve seal shown in FIG. 3a.

FIG. 3c is a section view along B-B of the duckbill check valve seal shown in FIG. 3a.

FIG. 3d is a section view along C-C of the duckbill check valve seal shown in FIG. 3b.

FIG. 3e is a detailed view of portion D of the duckbill check valve seat shown in FIG. 3b.

FIG. 3f is a detailed view of portion E of the duckbill check valve seat shown in FIG. 3b.

FIG. 3g is a side view along A-A of the duckbill check valve seat shown in FIG. 3a.

FIG. 3h is a side view along B-B of the duckbill check valve seat shown in FIG. 3a.

FIG. 3i is a side perspective view of the duckbill check valve seat shown in FIG. 3a.

FIG. 3j is a bottom view of the duckbill check valve seat shown in FIG. 3a.

FIG. 7a is a perspective cross-sectional view of a valve housing with a drive mechanism of a diaphragm pump according to some embodiments of the present invention.

FIG. 7b is a plan view of the valve housing with the drive mechanism shown in FIG. 7a according to some embodiments of the present invention.

FIG. 9, including FIGS. 9a, 9b and 9c, shows other valve configurations according to some embodiments of the present invention.

FIG. 10 shows an example of an umbrella style check valve used on rotary diaphragm pumps that is known in the art.

DETAILED DESCRIPTION OF THE INVENTION

The present invention will first be described in relation to FIGS. 5a to 9, which show a valve housing having one or more valve assemblies that forms part of a diaphragm pump, according to some embodiments of the present invention. After that, embodiments of the valve assemblies will be described in relation to FIGS. 1a to 4, which show in detail embodiments of the duckbill valve assembly, consistent with that disclosed in the aforementioned U.S. patent application Ser. No. 12/723,975, filed on 15 Mar. 2010.

FIGS. 5a to 9

Figure 4:
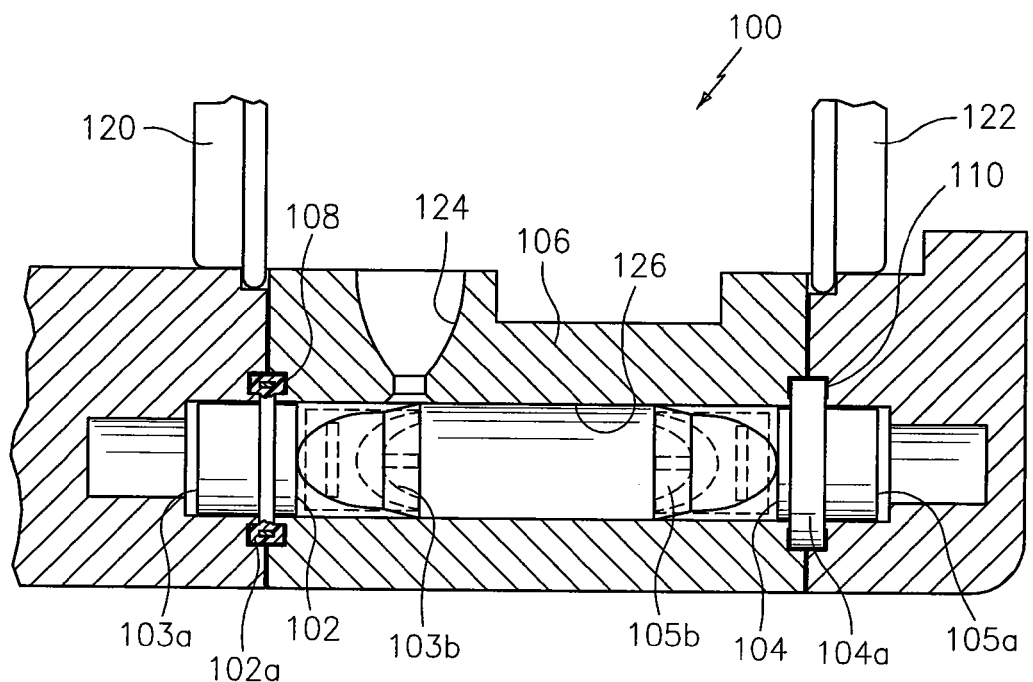
FIG. 4 is a cross-section of part of a pump having two duckbill check valve assemblies according to some embodiments of the present invention.
Figure 6A:
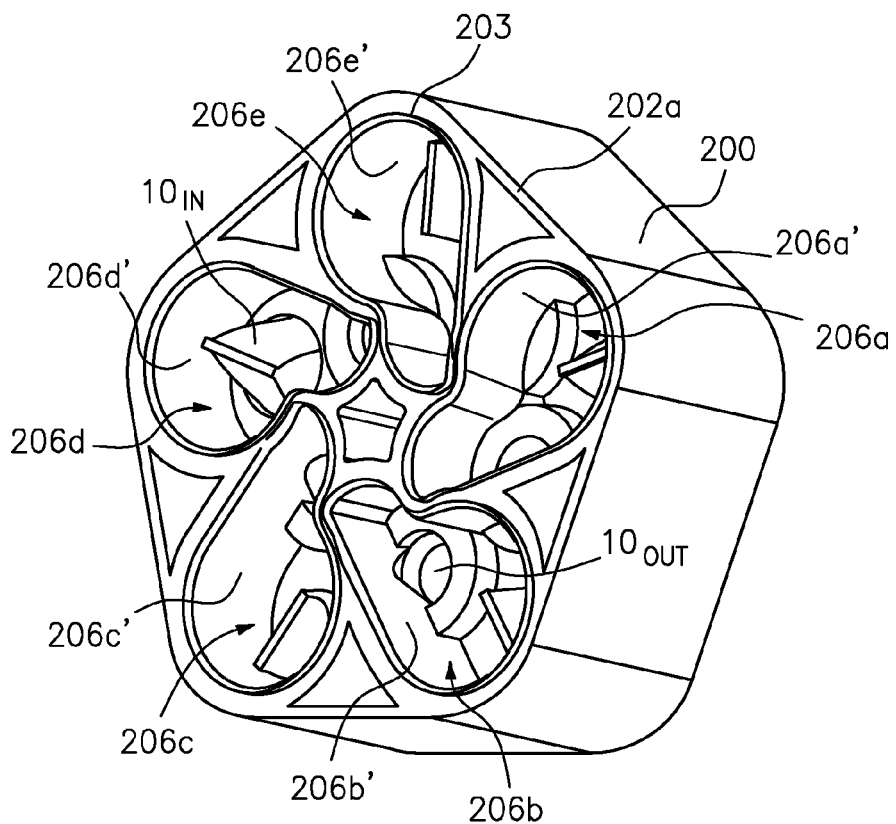
FIG. 6a is a perspective view of the other side of the valve housing shown in FIG. 5a according to some embodiments of the present invention.
Figure 5A:
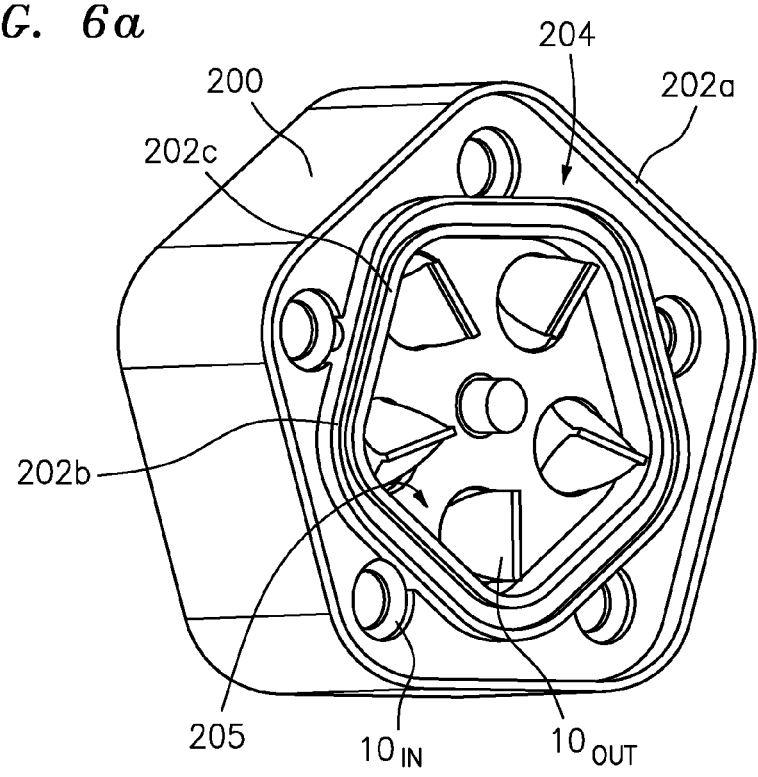
FIG. 5a is a perspective view of one side of a valve housing that forms part of a diaphragm pump according to some embodiments of the present invention.
Figure 5B:
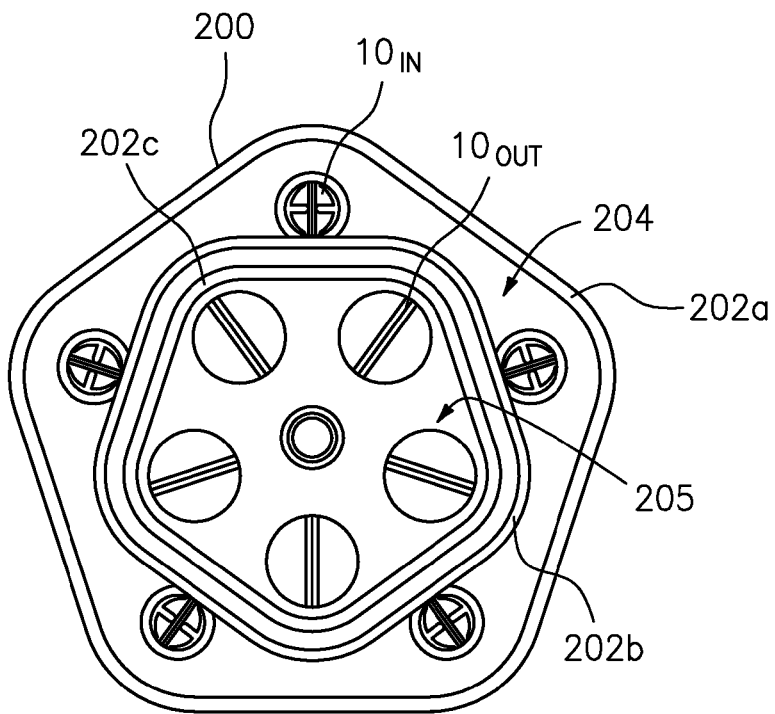
FIG. 5b is a plan view of the valve housing shown in FIG. 5a according to some embodiments of the present invention.
Figure 6B:
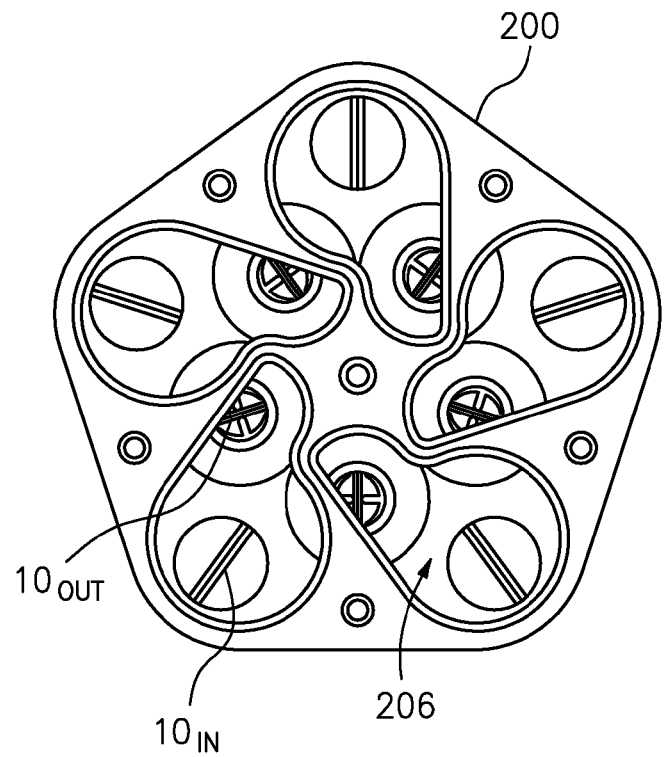
FIG. 6b is a plan view of the valve housing shown in FIG. 6a according to some embodiments of the present invention.

FIGS. 5a, 5b, 6a and 6b show a valve housing 200 having one side shown in FIGS. 5a, 5b and another side shown in FIGS. 6a, 6b that form part of a five chamber diaphragm pump generally indicated as 300 (see FIG. 8) according to some embodiments of the present invention. The valve housing 200 is configured with a two part construction having valve housing members 201a, 201b, each is configured in the shape of a pentagon having five sides as shown. The valve housing 200 includes five inlet valve assemblies labeled 10 in and five outlet valve assemblies labeled 10out. As shown, one of the five inlet valve assemblies is labeled 10 in, one of the five outlet valve assemblies is labeled 10out, and the remaining four inlet valve assemblies and four outlet valve assemblies are unlabeled so as not to clutter each Figure. Each valve assembly 10 in, 10out corresponds, by way of example, to a duckbill valve 10 shown and described in detail below in relation to FIG. 1a to FIG. 4.

The present invention is shown and described in relation to a diaphragm pump having five inlet and outlet valve assemblies, although the scope of the invention is not intended to be limited to the specific number of inlet and outlet valve assemblies. For example, the scope of the invention is intended to include embodiments have fewer than five inlet and outlet valve assemblies or more than five inlet and outlet valve assemblies. In particular, the scope of the invention is intended to include embodiments having four inlet valve assemblies and four outlet valve assemblies; or embodiments having three inlet valve assemblies and three outlet valve assemblies; or embodiments having two inlet valve assemblies and two outlet valve assemblies; or embodiments having one inlet valve assembly and one outlet valve assemblies. Furthermore, the scope of the invention is intended to include embodiments having six inlet valve assemblies and six outlet valve assemblies; or embodiments having seven inlet valve assemblies and seven outlet valve assemblies; or embodiments having N inlet valve assemblies and N outlet valve assemblies, where N is a whole number greater than 7.

Figure 8:
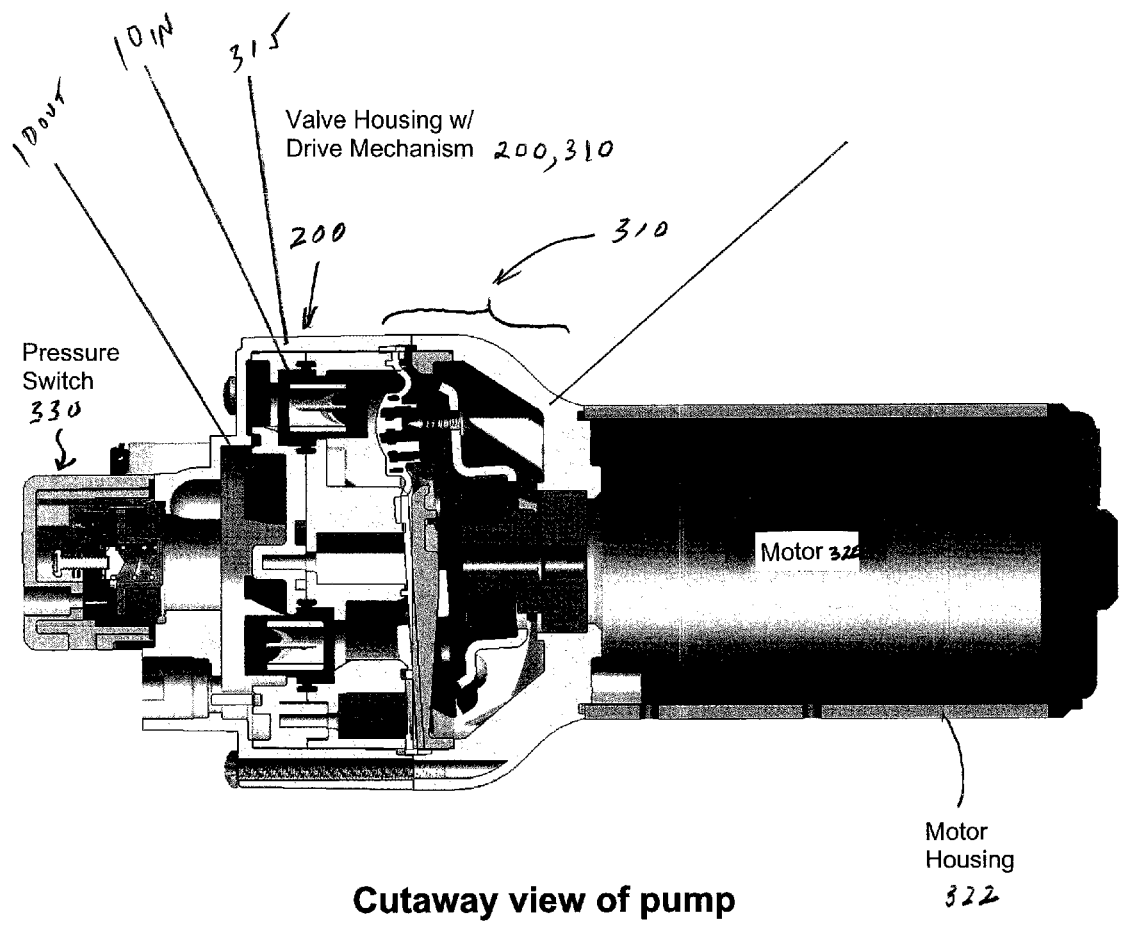
FIG. 8 is a cutaway view of a diaphragm pump from one side according to some embodiments of the present invention.

The valve housing 200 is configured with an outer wall or rim 202a, an intermediate wall or rim 202b and an inner wall or rim 202c. The outer wall or rim 202a and the intermediate wall or rim 202b are configured so as to form an inlet chamber generally indicated by an arrow 204 that is in fluid communication with an inlet port (not shown) for receiving fluid into the diaphragm pump 300 (FIG. 8). The inner wall or rim 202c and an upper housing portion 315 (see FIG. 8) are configured so as to form an outlet chamber generally indicated as by an arrow 205 that is in fluid communication with the outlet port (not shown) for providing fluid from the pump. The intermediate wall or rim 202b and the inner wall or rim 202c are configured to receive an O-ring or some other suitable sealing element or arrangement (not shown) so as to separate the inlet chamber 204 from the outlet chamber 205.

In operation, fluid is drawn and passed from the inlet chamber 204 through and via the five inlet valve assemblies 10 in, sequentially, to a valve chamber generally indicated by an arrow 206 (FIG. 6b). As shown, the valve chamber 206 is formed by five valve chamber cavities generally indicated by arrows 206a, 206b, 206c, 206d, 206e, where each of the five valve chamber cavities 206a, 206b, 206c, 206d, 206e is configured by a respective cavity wall 206a', 206b', 206c', 206d', 206e', according to some embodiments of the present invention. Fluid is drawn and passed from the valve chamber 206 through and via the five outlet valve assemblies 10out, sequentially, sequentially, to the outlet chamber 205, where the fluid passes to the outlet port (not shown) and from the pump 300. The provisioning of the fluid from the outlet chamber 205 to the outlet port (not shown) is accomplished via a conduit is has an angled relationship (i.e. a non-tangential relationship) with respect to one of the five sides of the valve housing 200.

FIGS. 7a and 7b show the valve housing 200 in relation to a drive mechanism generally indicated by arrow 310, which may include a diaphragm 310a, a piston 310b and a wobble plate arrangement generally indicated by arrow 310c. Drive mechanisms like element 310 are known in the art and not described herein in detail since the basic operation thereof does not form part of the underlying invention. Moreover, the scope of the invention is not intended to be limited to any particular type or kind of drive mechanism, and is intended to include other types or kinds of drive mechanisms than that specifically shown in FIGS. 7a, 7b, and 8.

Each valve housing member 201a, 201b is configured to receive the five inlet valve assemblies 10 in and the five outlet valve assemblies 10out. For example, consistent with that described below, each valve assembly 10 in, 10out is configured with a valve seat 12 having a base portion 18 with an external circumferential protruding portion 18a, consistent with that shown in FIG. 1a, 1b, 3b, 3c, 3e3g, 3h, 3i. Each valve housing member 201a, 201b is configured to receive an upper or lower part of a respective external circumferential protruding portion 18a of each of the five inlet valve assemblies 10 in and the five outlet valve assemblies 10out in order to retain and frictionally engage the inlet valve assemblies 10 in, 10out in relation to the valve housing 200. For example, consistent with that shown in FIGS. 7a, 7b, each valve housing member 201a, 201b may be configured with a respective circular channel 201a', 201b' shaped to receive and frictionally engage a respective external circumferential protruding portion 18a of each of the inlet and outlet valve assemblies 10 in, 10out. During assembly, the external circumferential protruding portion 18a of each inlet and outlet valve assemblies 10 in, 10out may be first arranged in a respective circular channel like element 201a' of the one valve housing member 201a; then the valve housing member 201b may be coupled to the valve housing member 201a so that the respective circular channel 201a', 201b' receive, retain and frictionally engage the respective external circumferential protruding portion 18a of each of the inlet and outlet valve assemblies 10 in, 10out. The channels 201a', 201b' are configured with a shape that substantially corresponds to the shape of the respective external circumferential protruding portion 18a. In view of this, and within the spirit of the present invention, embodiments are envisioned in which the respective external circumferential protruding portion 18a have a different shape, e.g., square or triangular, than that shown and described herein, so that the channels 201a', 201b' also have a corresponding different shape e.g., a corresponding square or triangular shape, than that shown and described herein.

FIG. 8 shows the diaphragm pump generally indicated as 300 from one side according to some embodiments of the present invention that includes the following: the valve housing 200 arranged inside the upper housing portion 315 with the drive mechanism 310 shown in FIGS. 7a, 7b arranged inside a drive mechanism housing portion 317; a motor pump 320 arranged inside a motor housing 322 and coupled to the valve housing 200 with the drive mechanism 310 shown in FIGS. 7a, 7b; and a pressure switch arrangement 330 coupled to the valve housing 200 with the drive mechanism 310 shown in FIGS. 7a, 7b. The motor pump 320, the motor housing 322 and the pressure switch arrangement 330 do not form part of the underlying invention and are thus not described in further detail herein. Moreover, the scope of the invention is intended to be limited to the type or kind of motor pump 322, motor housing 322 or pressure switch arrangement 330, and is intended to include using other types or kinds of motor pumps, motor housings or pressure switch arrangements in conjunction with the underlying invention either now known or later developed in the future.

FIG. 9, including FIGS. 9a, 9b and 9c, shows other valves according to some possible embodiments of the present invention, where FIG. 9a shows a fine C valve; FIG. 9b shows a coarse C valve; and FIG. 9c shows a polypro C valve. By way of example, the polypro C valve may take the form of the valve disclosed in U.S. patent application Ser. No. 12/112, 448, filed 30 Apr. 2008, which is hereby incorporated by reference in its entirety.

FIGS. 1a to 4: The Duckbill Valve Assembly

The Duckbill Check Valve Assembly 10

FIGS. 1a and 1b show a duckbill check valve assembly generally indicated as 10 according to some embodiments of the present invention, which includes a duckbill valve in the form of a duckbill check valve seat 12 (see FIGS. 3a through 3j) and an insert for arranging inside in the form of a duckbill check valve support 14 (see FIGS. 2a through 2j).

The Duckbill Check Valve Seat 12

The following description of duckbill check valve seat 12 is provided by way of example. The scope of the invention is intended to include deviations from that shown and description so as to still be within the spirit of the invention.

As shown in FIGS. 1a and 1b, the duckbill check valve seat 12 is made of pliable material, shaped like the beak of a duck, and configured with a duckbill portion 16 and a base portion 18. The duckbill portion 16 is configured with a flattened end 20 having a slit 22 to flex open so as to allow and provide fluid and particulate to pass through, and to close to prevent the backflow of the fluid and particulate. For example, in operation when a fluid is pumped through the duckbill portion 16, the flattened end 20 opens to permit the pressurized fluid to pass; and when internal pressure is removed, the duckbill end 20 returns to its flattened shape, closing the slit 22, thus preventing backflow. The base portion 18 is configured with an external circumferential protruding portion 18a, shown by way of example, as a sealing ring or bead, for coupling duckbill check valve seat 12 to another device, such as a supply line or pump (not shown) that provides fluid and particulate. The base portion 18 is also configured on both sides with internal recesses 18b and 18c in its internal or interior wall 18d that forms an internal cavity of the base portion 18 of the duckbill check valve seat 12.

The base portion 18 is also configured with an inwardly extending sealing portion 18e having an annular ledge 18f for providing support for the duckbill check valve support 14 once inserted therein for helping to prevent it from being displaced from the fluidic backpressure. The base portion 18 is also configured with a chamfered rim 38 shown as about 45° to facilitate the insertion of the duckbill check valve support 14 therein, as best shown in FIGS. 3b, 3c. By way of example, the duckbill check valve seat 12 is shown in further detail in FIG. 3a through 3j, where features of the duckbill check valve seat 12 are labeled using the reference numeral of FIGS. 1a, 1b. To improve readability of the application in relation to that shown in FIG. 3a through 3j, and to reduce the overcrowding of unnecessary and redundant lead lines, some features shown in FIGS. 1a, 1b are not labeled in one or more of the FIG. 3a through 3j.

Reference labels 12a (FIG. 3a) through 12hh (FIG. 3h) identify various dimensions that a person skilled in the art can be used to construct the duckbill check valve seat 12, based on the particular application. A person skilled in the art would be able to generate a particular set of dimensions to construct the duckbill check valve seat 12 with undue experimentation, including by generating the set of dimensions by hand calculation or by using a computer aided design program or the like either now known or later developed in the future. The scope of the invention is not intended to be limited to any particular application, any particular set of dimensions used in relation to any particular application, or the manner in which the set of dimensions is generated in relation to any particular application.

The Insert or Duckbill Check Valve Support 14

The following description of the insert 14 is provided by way of example. The scope of the invention is intended to include deviations from that shown and description so as to still be within the spirit of the invention.

As shown in FIGS. 1a and 1b, the insert 14 has a base portion 30 that is configured to arrange the insert 14 inside the duckbill check valve seat 12, and has a W-shaped portion generally indicated as 32 configured with an opening 34 to pass the fluid and particulate through the duckbill check valve support 14 to the duckbill check valve seat 12, and also configured to provide support for walls 16a, 16b of the duckbilled portion 16 of the duckbill check valve seat 12 in response to a back pressure caused by the fluid and particulate. The insert 14 also has an internal wall 36 forming an internal cavity so as to pass the fluid and particulate through and out the opening 34.

The W-shaped portion 32 may include two end supporting arms 32a, 32d and two raised opposing intermediate supporting arms 32b, 32c that are configured to form the opening 34 to pass the fluid and particulate through the duckbill check valve support 14 to the duckbill check valve seat 12 and also to provide support for the walls 16a, 16b of the duckbill check valve seat 12 in response to a back pressure caused by the fluid and particulate, including back pressures up to about 80 PSI. The support arm 32a has two side portions $32a_1$ and $32a_2$; the support arms 32b, 32c have respective side portions $32b_1$ and $32c_1$; and the support arm 32d has two side portions $32d_1$ and $32d_2$. The side portions $32a_1$ and $32a_2$; $32b_1$ and $32c_1$; and $32d_1$ and $32d_2$ respectively contact and support the walls 16a, 16b of the duckbilled portion 16 of the duckbill check valve seat 12 in response to the back pressure caused by the fluid and particulate. The support arm 32a has two curved portions $32a_3$ and $32a_4$, and the support arm 32d has two curved portions $32d_3$ and $32d_4$, so that the walls 16a, 16b of the duckbilled portion 16 of the duckbill check valve seat 12 are not resting on edges to minimize wear. The W-shaped portion 32 also includes curved portions 33a, 33b, 33c, 33d that extend respectively between the support arms 32a, 32b, 32c, 32d and that are configured to form the opening 34 to pass the fluid and particulate through the duckbill check valve support to the duckbill check valve seat 12. The support arm 32b is configured with a strengthening rib or portion $32b_2$ (see FIG. 2b) extending along the wall 36 for providing additional strength. The support arm 32c is configured with a similar strengthening rib or portion $32c_2$ (see FIG. 2c) extending along the wall 36 for providing additional strength. In FIG. 2b, the reference label 32' points to the underside of the W-shaped portion 32 shown, e.g., in FIGS. 2a.

The base portion 30 is also configured with a pair of locating tabs or wings 30a, 30b protruding from both sides thereof for being received in, arranged in relation to, and cooperating with the internal recesses 18b and 18c in the internal or interior wall 18d of the duckbill check valve seat 12, so as to provide axial alignment and the proper depth when the duckbill check valve support 14 is inserted into the duckbill check valve seat 12, as well as to prevent the insert from being pushed out by the back pressure. As shown, the locating tabs or wings 30a, 30b and the internal recesses 18b and 18c extend partially around the respective circumferential surfaces of the base portion 30 of the duckbill check valve support 14 or the internal or interior wall 18d of the duckbill check valve seat 12.

By way of example, the duckbill check valve support 14 is shown in further detail in FIG. 2a through 2j, where features of the duckbill check valve support 14 are labeled using the reference numeral of FIGS. 1a, 1b. To improve readability of the application in relation to that shown in FIG. 2a through 2j, and to reduce the overcrowding of unnecessary and redundant lead lines, some features shown in FIGS. 1a, 1b are not labeled in one or more of the FIG. 2a through 2i.

Reference labels 14a (FIG. 2a) through 14s (FIG. 2j) identify various dimensions that a person skilled in the art can be used to construct the duckbill check valve support 14, based on the particular application. A person skilled in the art would be able to generate a particular set of dimensioned to construct the duckbill check valve support 14 with undue experimentation, including by generating the set of dimensions by hand calculation or by using a computer aided design program or the like either now known or later developed in the future. The scope of the invention is not intended to be limited to any particular application, any particular set of dimensions used in relation to any particular application, or the manner in which the set of dimensions is generated in relation to any particular application.

One Particular Application

By way of example, in one particular application the duckbill check valve support 14 could be designed to pass particulates, including pulp and seeds, having a size of about 0.161 inches (about 4 millimeters) and may be dimensioned in inches in relation to that shown in FIGS. 2d through 2j as follows:

| Dimension | FIG. | Approximate Size (inches) |
|---|---|---|
| 14a | 2d | 0.360 |
| 14b, 14f | 2d, 2e | 0.050 |
| 14c | 2d | 0.235 |
| 14d | 2d | 0.280 |
| 14e | 2d | 0.060 |
| 14g | 2e | 0.296 |
| 14h | 2e | 0.350 |
| 14i | 2e | 0.050 |
| 14j | 2f | 0.350 |
| 14k | 2g | 0.141 |
| 14l | 2i | 0.475 |
| 14m | 2i | 0.100 |
| 14n | 2i | 0.060 |
| 14o | 2i | 0.120 |
| 14p | 2i | 0.300 |
| 14q | 2i | 0.550 |
| 14r | 2j | 0.147 |
| 14s | 2i | 0.161 |

Figure 2J:
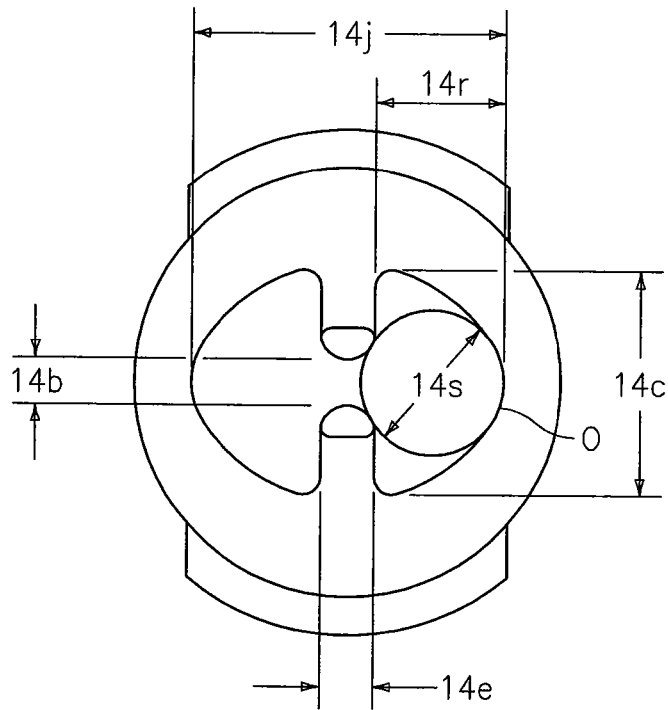
FIG. 2j is a diagram of a top view of a duckbill check valve support that forms part of the duckbill check valve assembly shown in FIGS. 1a and 1b.

In this particular application, the duckbill check valve support 14, including the two end supporting arms 32a, 32d, the two raised opposing intermediate supporting arms 32b, 32c, and the curved portions 33a, 33b, 33c, 33d, is dimensioned to form the opening 34 so as to pass large particulates that may be the size of about 0.161 inches (or about 4 millimeters) or more. Because of the relationship between the dimension of the opening 34 and the size of the large particulates that it needs to pass, when the rigid support is inserted in the valve seat, the two end supporting arms 32a, 32d, and the two raised opposing intermediate supporting arms 32b, 32c combine to contact, extend along and support the interior side of the walls 16 that converge so as to form the flattened end 20 of the valve seat 10. The two end supporting arms 32a, 32d, and the two raised opposing intermediate supporting arms 32b, 32c substantially extend along the interior side of the walls 16 to the flattened end 20 of the valve seat 10. In FIG. 2j, the opening ○ has a diameter of about 0.161 inches that can allow particulate having a dimension of about the same size to pass through. The structural advantage of this design according to the present invention is that it results in the walls 16 of the flattened end 20 of the valve seat 10 being able to sustain their form when being subjected to back pressures as high as 80 PSI, without the duckbill valve failing.

By way of example, in this particular application the duckbill check valve support 14 was designed to cooperate with the duckbill check valve seat 12 dimensioned in inches in relation to that shown in FIGS. 3d through 3j as follows:

| Dimension | FIG. | Approximate Size (inches) |
|---|---|---|
| 12a | 3a | 0.060 |
| 12b | 3a | 0.570 |
| 12c | 3b | 0.550 |
| 12d | 3b | 0.250 |
| 12e | 3b | 0.100 |
| 12f | 3b | 0.350 |
| 12g | 3b | 0.475 |
| 12h | 3b | 0.720 |
| 12i | 3b | 0.786 |
| 12j | 3c | 0.475 |
| 12u | 3f | 0.060 |
| 12v | 3f | 0.060 |
| 12z | 3f | 0.002 |

FIG. 4

FIG. 4 is a cross-section of part of a pump generally indicated as 100 having two duckbill check valve assemblies 102, 104 according to some embodiments of the present invention. The pump 100 has a housing 106 with two circumferential grooves 108, 110. Each duckbill check valve assemblies 102, 104 has its external circumferential protruding portion 102a, 104a (i.e. sealing ring or bead) arranged in a respective circumferential groove 108, 110 for holding each duckbill check valve assembly 102, 104 in place in the housing 106. In FIG. 4, the external circumferential protruding portion 102a is shown in cross-section, while the external circumferential protruding portion 104a is not. Moreover, as shown the two duckbill check valve assemblies 102, 104 each includes a seat portion 103a, 105a respectively and a support portion 103b, 105b (in phantom). In operation, the fluid and particulate is pumped alternately through the check valve via the reciprocation of dual diaphragm system 120, 122, passing through channels 124, 126 with the two duckbill check valve assemblies 102, 104 being arranged in the channel 126 as shown. The sealing ring or bead allows the same duckbill check valve assembly 102, 104 to be arranged in either circumferential groove 108, 110, so the same duckbill check valve assembly 102, 104 can be used in both places.

List All Possible Applications

Possible applications of the present invention may include any application in which a rotary diaphragm pump is currently being used, including a pump capable of handling solids pertaining to mixes used for making smoothies for various customers developing crew served smoothie machines, including for use with acidic juices or non dairy, especially where the duckbill valve is suited to passing high viscosity liquids such as condiments or fluids that contain particulates up to 4 mm in diameter. Such applications may include condiment, fruit juice, smoothie, milkshake, hand lotion, soaps, shampoos and other viscous materials with particulates that would normally foul typical spring loaded check valves.

The Scope Of The Invention

Further still, the embodiments shown and described in detail herein are provided by way of example only; and the scope of the invention is not intended to be limited to the particular configurations, dimensionalities, and/or design details of these parts or elements included herein. In other words, a person skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. A diaphragm pump comprising:
   a valve housing configured with inlet openings and outlet openings;
   inlet duckbill check valve assemblies, each configured to be arranged in a respective inlet opening; and
   outlet duckbill check valve assemblies, each configured to be arranged in a respective outlet opening;
   each duckbill check valve assembly comprising:
      a duckbill check valve seat configured with an end having a slit to open to provide the fluid and particulate, and to close to prevent the backflow of the fluid and particulate; and
      a duckbill check valve support having a base portion configured to be inserted inside the duckbill check valve seat, and having a W-shaped portion configured with an opening to pass the fluid and particulate through the duckbill check valve support to the duckbill check valve seat and also configured to provide support for walls of the duckbill check valve seat in response to back pressure caused by the fluid and particulate, the W-shaped portion comprising two end supporting arms and two raised intermediate supporting arms configured to form the opening to pass the fluid and particulate through the duckbill check valve support to the duckbill check valve seat and provide support for walls of the duckbill check valve seat in response to back pressure caused by the fluid and particulate, including back pressure up to about 80 PSI.

2. A diaphragm pump according to claim 1, wherein the valve housing is configured with a valve housing chamber to receive the fluid from an inlet chamber via the inlet duckbill check valve assemblies.

3. A diaphragm pump according to claim 1, wherein the valve housing is configured with a valve housing chamber to provide the fluid to an outlet chamber via the outlet duckbill check valve assemblies.

4. A diaphragm pump according to claim 1, wherein each inlet duckbill check valve seat is configured with the end having the slit to open to provide the fluid and particulate from an inlet side to a discharge side, and to close to prevent the backflow of the fluid and particulate from the discharge side to inlet side.

5. A diaphragm pump according to claim 1, wherein each outlet duckbill check valve seat is configured with the end having the slit to open to provide the fluid and particulate from a discharge side, and to close to prevent the backflow of the fluid and particulate from the discharge side to an inlet side.

6. A diaphragm pump according to claim 2, wherein the valve housing is shaped as a pentagon, and the valve housing has five inlet openings for providing the fluid and particulate from the inlet chamber to the valve housing chamber.

7. A diaphragm pump according to claim 3, wherein the valve housing is configured as a pentagon, and the valve housing has five outlet openings for providing the fluid and particulate from the valve housing chamber to the outlet chamber.

8. A diaphragm pump according to claim 1, wherein the W-shaped portion is configured with outer walls to support walls of the end of the duckbill check valve seat.

9. A diaphragm pump according to claim 1, wherein the duckbill check valve support includes two locating tabs or wings, and the base portion of the duckbill check valve seat includes two locating recesses arranged in its internal walls and configured to receive the two locating tabs or wings in order to axially align the duckbill check valve seat in relation to the duckbill check valve support in a proper orientation and at a proper depth, as well as to prevent the duckbill check valve support from being pushed out of the duckbill check valve seat due to back pressure.

10. A diaphragm pump according to claim 1, wherein the duckbill check valve support is made of metal or plastic, the duckbill check valve seat is made of a pliable material, including rubber or a synthetic elastomeric material, or the combination thereof.

11. A diaphragm pump according to claim 1, wherein the diaphragm pump is a rotary diaphragm pump.

12. A diaphragm pump comprising:
    a valve housing configured with at least one inlet opening and at least one outlet opening; and
    at least one inlet duckbill check valve assembly configured to be received in said at least one inlet opening;
    at least one outlet duckbill check valve assembly configured to be received in said at least one outlet opening;
    each duckbill check valve assembly comprising:
       a duckbill check valve seat configured with an end having a slit to open to provide the fluid and particulate, and to close to prevent the backflow of the fluid and particulate; and
       a duckbill check valve support having a base portion configured to be inserted inside the duckbill check valve seat, and having a W-shaped portion configured with an opening to pass the fluid and particulate through the duckbill check valve support to the duckbill check valve seat and also configured to provide support for walls of the duckbill check valve seat in response to back pressure caused by the fluid and particulate, the W-shaped portion comprising two end supporting arms and two raised intermediate supporting arms configured to form the opening to pass the fluid and particulate through the duckbill check valve support to the duckbill check valve seat and provide support for walls of the duckbill check valve seat in response to back pressure caused by the fluid and particulate, including back pressure up to about 80 PSI.

13. A diaphragm pump according to claim 12, wherein
    said valve housing is configured with a plurality of inlet openings; and
    said at least one inlet duckbill check valve assembly comprising a plurality of inlet duckbill check valve assemblies, each configured to be arranged in a respective one of said plurality of inlet openings.

14. A diaphragm pump according to claim 13, wherein
    said valve housing is configured with a plurality of outlet openings; and
    said at least one outlet duckbill check valve assembly comprising a plurality of outlet duckbill check valve assemblies, each configured to be arranged in a respective one of said plurality of outlet openings.

15. A diaphragm pump according to claim 12, wherein said valve housing is configured with a plurality of outlet openings; and
said at least one outlet duckbill check valve assembly comprising a plurality of outlet duckbill check valve assemblies, each configured to be arranged in a respective one of said plurality of outlet openings.

\* \* \* \* \*